Oct. 6, 1942.         I. COHEN         2,298,036
COCK OR VALVE
Filed April 30, 1940
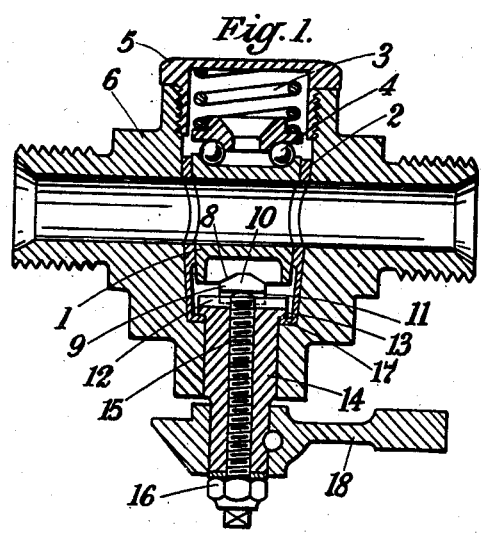
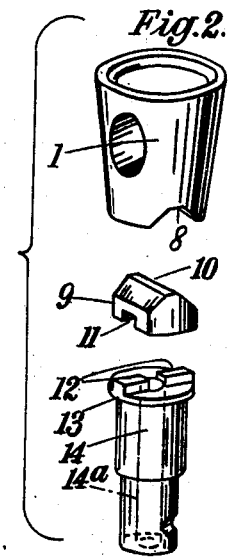
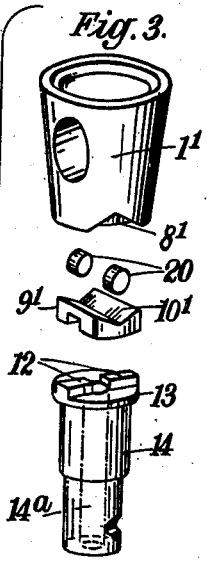
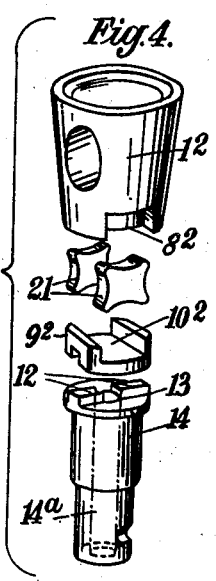
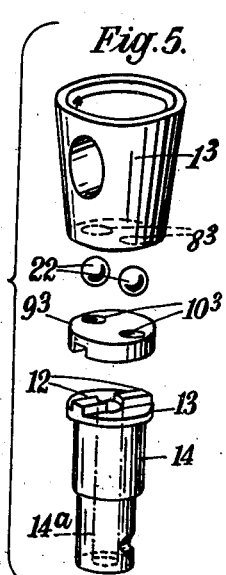
Inventor
Israel Cohen
by
Sommers+Young
Attorneys Patented Oct. 6, 1942

2,298,036

UNITED STATES PATENT OFFICE 2,298,036

COCK OR VALVE

Israel Cohen, Gunnersbury, London, England, assignor to Aircraftings Limited, Gunnersbury, London, England, a British joint-stock company Application April 30, 1940, Serial No. 332,590
In Great Britain May 18, 1939

6 Claims. (Cl. 251—97)

This invention relates to improvements in cocks or valves and is particularly concerned with petrol cocks such as are used on aircraft. Such cocks must be adapted for ready and certain control and there must be no tendency for the valve to stick and require undue effort for its operation. For this purpose, the plugs of petrol and other cocks have been initially loosened in their seats by camming devices associated with the means for turning the plugs.

According to this invention, the spindle of the cock is separate from the conical plug and is coupled thereto by a so-called floating coupling device adapted for imparting not only rotary motion but also a slight end motion for the purpose of loosening the plug in its seat. The said means is so devised that the resistance to end motion of the plug is less than the frictional resistance preventing relative rotation between the plug and its seating. The coupling device aforesaid may take various forms. For example, it may be a floating device adapted for action in some respects like an Oldhams coupling. With such a coupling device the plug need not be in accurate axial alignment with the spindle.

In one construction, one side of the floating coupling device is engaged with the actuating spindle so as to be transversely slidable relatively to the spindle, the opposite side being formed with either a V-shaped projection or depression engaging with a corresponding depression or projection of the plug permitting of transverse sliding in a direction at right angles to the direction of transverse sliding on the spindle side. On rotating the spindle, the plug tends to resist rotation owing to its frictional seating but the interaction of the V-formations produces a slight end-wise movement or unseating whereupon resistance to rotation is removed and the plug rotates with the spindle. When operation of the spindle ceases, a seating spring or weight forces the plug tightly against its seating.

Since it may not be practicable to work to such fine tolerances as to ensure simultaneous engagement of the V-formations and the valve seating and plug tapers, the spindle may incorporate an adjusting device operative upon the floating coupling device.

In order that the invention may be readily understood reference is directed to the accompanying drawing wherein:

Figure 1 is a central vertical section of one practical construction in accordance with the invention.

Figure 2 is an exploded perspective view of the essential working parts of Figure 1.

Figures 3–5 are views similar to Figure 2 of modifications adapted for incorporation in a valve body similar to that shown in Figure 1.

In Figures 1 and 2 the conical plug 1 is pressed downwardly in its seating in a liner 2 by a spring 3 operating through a thrust ball bearing 4. The spring 3 is enclosed by a hollow cap 5 screwed into the valve body 6.

The small end of the conical plug 1 may be recessed and has formed diametrically across it a V-notch 8. A small block 9 having a length approximately equal to the diameter of the small end of the plug 1 and of any convenient width is provided on one side with a V-shaped formation or rib 10 and on the other side with a key groove 11 running at right angles to the rib 10. The rib 10 is adapted to engage the notch 8 and the groove 11 is adapted to engage key projections 12 on the enlarged end 13 of an operating spindle 14. The spindle 14 is provided with a threaded bore $14^a$ for the reception of a screwed stud 15 the rounded upper end of which engages the block 9 and is locked in any position of adjustment by means of a nut 16.

As will be apparent the spindle 14 is inserted into the valve body 6, before the insertion of the plug 1, and so that the shoulder formed by the enlarged end 13 comes to rest on a flange 17 on the small end of the liner 2. The spindle 14 may be suitably packed in its bearing in the body 6 and its protruding end portion is adapted for the mounting thereon of an operating lever arm 18 or other operating means.

When the arm 18 is turned to close the valve the plug 1 tends to resist rotation owing to its frictional seating and the interaction of the V-formations 8 and 10 produces a slight endwise movement or unseating whereupon resistance to rotation is removed and the plug 1 rotates with the spindle 14. When operation of the spindle 14 ceases, the spring 3 again forces the plug 1 tightly against its seating 2, the angle of the V-formations 8 and 10 being such as to offer very slight resistance to endwise motion of the plug 1.

By adjusting the screwed stud 15 the position of the block 9 relative to the plug 1 can be regulated to a nicety and the axial lifting action caused to commence immediately the spindle 14 is turned.

According to the modifications illustrated in Figures 3, 4 and 5 the spindle 14 engages modified forms $9^1$, $9^2$ and $9^3$ respectively of the block 9 by means of key projections 12 on the enlarged end 13 of the spindle and a key groove 11 in the said modified blocks in the same manner as described with reference to Figures 1 and 2. However in the modifications connection between the blocks $9^1$, $9^2$ and $9^3$ and their respective plugs $1^1$, $1^2$ and $1^3$ is effected by means of intermediate devices.

In Figure 3 said intermediate devices consist of rollers 20. The block $9^1$ is provided with a V-groove $10^1$ and the plug $1^1$ with V-shaped diametrically opposed side recesses $8^1$ and each of the rollers 20 works partly in the groove $10^1$ and partly in a recess $8^1$.

In Figure 4 the intermediate devices consist of four pointed star shaped thrust members 21 which engage respective rectangular side recesses $8^2$ in the plug $1^2$ and a groove $10^2$ of rectangular section in the block $9^2$.

In Figure 5 two balls 22 constitute the intermediate devices and engage spherical or conical recesses $8^3$ and $10^3$ in the plug $1^3$ and block $9^3$ respectively. If spherical, the recesses $8^3$ and $10^3$ have a radius greater than the balls 22 in order that the balls may move relatively to said recesses. If desired, more than two balls 22 may be employed in which case a corresponding number of recesses $8^3$ and $10^3$ are provided.

On rotation of the spindle 14 of any one of the modifications shown in Figures 3–5 a slight axial movement is imparted to the plug during an initial portion of the rotary movement and when, by said slight axial movement the plug has become loose in its seat and the resistance to axial movement exceeds the resistance to rotary movement, the plug turns with the spindle.

A screwed stud similar to the stud 15 shown in Figure 1 may be provided for adjusting the position of each block relatively to its respective plug. If desired, co-operating projections or stops may be provided on the blocks $9^1$, $9^2$ and $9^3$ and the plugs $1^1$, $1^2$ and $1^3$ respectively to provide means for limiting the degree of rotational movement which the block can have in relation to the plug.

Advantageous features of the invention are as follows: First, the separate spindle and plug need not be accurately coaxial; second, the floating coupling device acts in the treble capacity of an Oldhams coupling, a driver and plug lifter; third, the provision of the adjusting screw obviates any necessity for a high degree of accuracy in manufacture and such adjusting screw being contained in the spindle presents no impediment to the attachment thereto of any operating device; fourth, since the spindle does not pass through the plug it is possible to employ a plug having an axial concentric port; fifth, there is no restriction to the angular setting of an operating handle or lever relatively to the internal parts of the cock.

I claim:

1. In a rotary valve, a cone-shaped plug part, a cone-shaped seat, means constantly tending to seat the plug part, a spindle part separate from said plug, and a freely floating coupling member operative between the spindle part and plug, said coupling member having a surface which is inclined with respect to an adjacent surface of one of said parts so as to exert an initial camming action upon operation of the spindle and being free to slide back and forth laterally in one direction relative to said one part, and being free to slide back and forth relative to the other said part in the other lateral direction, whereby said floating coupling member moves the plug axially before turning it, and exertion of lateral pressure on the plug by the spindle is avoided.

2. In a rotary valve, a cone-shaped plug part, a cone-shaped seat, means constantly tending to seat the plug part, a spindle part separate from said plug, and a freely floating coupling member operative between said parts, said coupling member having diametrically arranged coupling means, one of which comprises a cam device for transmitting an axial thrust to one of said parts upon operation of the spindle and being free to slide back and forth laterally in one direction relative to said one part, and being free to slide back and forth relative to the other said part in the other lateral direction, whereby said floating coupling member moves the plug axially before turning it, and exertion of lateral pressure on the plug by the spindle is avoided.

3. In a rotary valve, a cone-shaped plug part, a cone-shaped seat, means constantly tending to seat the plug part, a separate spindle part, a freely floating coupling member operative between said parts, said coupling member having a camming surface for exerting an initial camming action upon one of said parts upon operation of the spindle and being free to slide back and forth laterally in one direction relative to said one part, and being free to slide back and forth relative to the other said part in the other lateral direction, and rotatable means between said member and the part in question, said means being operative for transmitting the camming action and coupling drive from said member to said part, whereby the floating coupling member moves the plug axially before turning it, and exertion of lateral pressure on the plug by the spindle is avoided.

4. A cock or valve comprising in combination a body portion having a valve seat, a conical plug, means for resiliently holding said plug against said seat, an operating spindle separate from the plug, rotational coupling means comprising a block having a diametral V-shaped rib on the side, a diametral key projection on the inner end of the spindle to engage said key groove, said block having a diametral V-shaped rib on the other side thereof from said key groove extending at right angles to the key groove, said conical plug having a V-shaped diametral notch in its small end in which said V-shaped rib engages.

5. A cock or valve comprising in combination a body portion having a conical valve seat, a conical plug, means for resiliently holding said plug against said seat, the small end face of said plug having a pair of V-shaped recesses, an operating spindle separate from the plug, rotational coupling means comprising a block having a diametral key groove on one side, a diametral key projection on the inner end of the spindle to engage in said key groove, said block having a diametral V-shaped groove on the other side at right angles to the key groove, and a pair of rollers for engaging in said V-shaped groove and in the respective V-shaped recesses in the small end of the plug.

6. A cock or valve comprising in combination a body having a conical valve seat, a conical plug, means for resiliently holding said plug against said seat, the small end of said plug having rectangular side recesses formed therein, an operating spindle separate from the plug, the inner end of said spindle having a diametrally extending key projection, rotational coupling means comprising a block having a diametral key groove on one side to be engaged by said projection on the inner end of the spindle, said coupling means also having a diametral rectangular section groove at right angles to the key groove, and a pair of four pointed star shaped thrust members for engaging in said rectangular section groove and in respective rectangular side recesses in the small end of the plug.

ISRAEL COHEN.

CERTIFICATE OF CORRECTION.

Patent No. 2,298,036.                                                October 6, 1942.

ISRAEL COHEN.

It is hereby certified that error appears in the printed specification of the above numbered patent requiring correction as follows: Page 2, second column, line 33, claim 4, for "V-shaped rib on the" read --key groove on one--; and that the said Letters Patent should be read with this correction therein that the same may conform to the record of the case in the Patent Office.

Signed and sealed this 24th day of November, A. D. 1942.

Henry Van Arsdale,
Acting Commissioner of Patents.

(Seal)